March 6, 1934. W. W. CLARK 1,949,953
SEALING MEANS FOR ELECTROLYTIC DEVICES
Filed Nov. 21, 1930
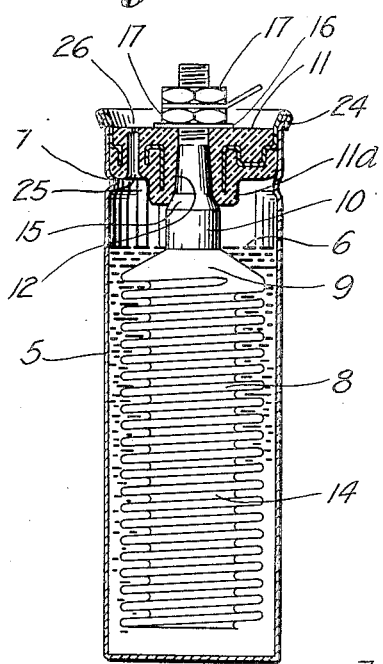
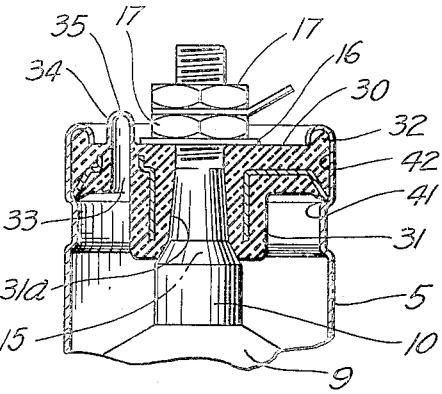
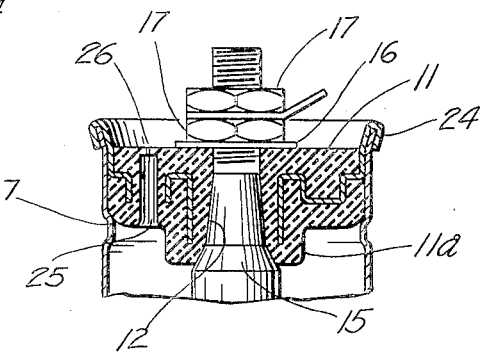
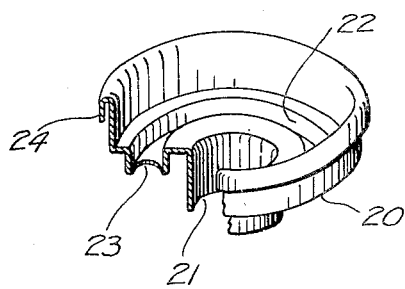
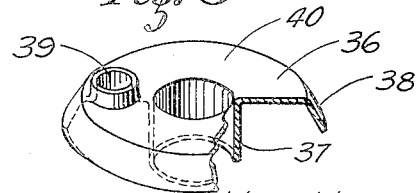
WALTER WILLIAM CLARK
INVENTOR.
BY Dorsey & Cole
ATTORNEYS.

Patented Mar. 6, 1934

1,949,953

UNITED STATES PATENT OFFICE 1,949,953

SEALING MEANS FOR ELECTROLYTIC DEVICES

Walter William Clark, North Adams, Mass., assignor to Sprague Specialties Company, Quincy, Mass., a corporation of Massachusetts Application November 21, 1930, Serial No. 497,308

6 Claims. (Cl. 175—315)

My invention relates to sealing means for electrolytic devices and more particularly to sealing means to prevent leakage at and around the cover of such devices.

In various types of electrolytic devices, for instance, electrolytic condensers, a liquid and airtight sealing of the device is of primary importance. Not only is this required to forestall spilling of the electrolyte, but also it is necessary to prevent the salt in the electrolyte from creeping through leaks which may occur in the joints of such device, a phenomenon which is characteristic of all electrolytic apparatus and which is due to the salt rising out of the solution. In fact, creepage of the electrolyte frequently takes place through joints which are impermeable to the liquid electrolyte. In view of the above and because of the importance of preventing contamination of the electrolyte by impurities which may enter through leaks, the requirement of perfect sealing of such devices is evident.

In the past it has been the practice to make the covers of such devices of a non-resilient insulating material—for instance—hard rubber or bakelite, and provide special sealing means, as gaskets, between the cover and the projecting electrode, as well as between the cover and the container.

I have found that by using a cover of soft rubber or of similar material, and providing therein a metal insert for the stiffening thereof as well as for the mechanical sealing of the container, I can dispense with the separate sealing means above indicated and thereby not only obtain a less expensive arrangement but also a seal which is not only equal but superior to the sealing means previously used.

Furthermore, the cover of electrolytic devices is, as a rule, provided with a nipple forming a valve for the escape of gases which may develop during the operation of the device. For this purpose, in practice, a soft rubber nipple is generally provided, which is secured to the cover; in such arrangement it is difficult to prevent leakage between the nipple and the cover. In my invention the use of a separate nipple is obviated as the material of the cover itself is adapted as material for the valve.

One object of my invention is, therefore, to provide novel sealing means between the cover of an electrolytic device and an electrode or electrodes projecting therethrough.

Another object of my invention is to provide sealing means to prevent leakage between the cover and the container.

A further object of my invention is to provide a cover which in itself is effective as a gasket between the cover and the electrode or electrodes projecting therethrough as well as between the cover and the container.

A further object of my invention is to provide a cover of such material that a portion thereof may form a vent for the escape of gases.

A further object of my invention is to reinforce the cover by a metal insert molded therein.

A further object of my invention is to reinforce the cover by a metal insert molded therein, a portion of which insert also forms part of the sealing means.

Other objects of my invention will appear as the description progresses.

Referring to the drawing which forms part of this specification:

Figure 1 is a side elevation, partly in section, of an electrolytic condenser embodying my invention.

Fig. 2 is an enlarged fractional side elevation, partly in section, showing one embodiment of my invention.

Fig. 3 is a perspective view, partly broken away, of a metal insert provided in the cover of Figs. 1 and 2.

Fig. 4 is a fractional side elevation, partly in section, showing an alternative embodiment of my invention.

Fig. 5 is a perspective view, partly broken away, of a metal insert provided in the cover of Fig. 4.

My invention will be illustrated in connection with an electrolytic condenser as shown in Figure 1 which comprises a cylindrical container 5 of copper or other inert material constituting the cathode. The container 5 is provided with a cover 11, more fully described hereafter, and contains a suitable electrolyte 6, into which projects an electrode 14, supported by the cover 11.

The electrode 14, which is of aluminum or other film-forming metal, constitutes the anode of the condenser and may be of any suitable design. However, I prefer to provide anodes of the type described in the copending applications of F. Desmond Sprague and R. U. Clark, Ser. No. 416,939, filed December 27, 1929 and of Max Knab, Ser. No. 441,128, filed April 2, 1930, which possess various advantages, fully described in said applications.

Such an electrode as shown in Figure 1 consists of a tubular portion 8, provided with helical corrugations, which through a conical portion 9 extends in a slightly tapered stem 10, the portions 8, 9 and 10 being formed preferably from a single piece of metal. The stem 10 is provided with a beveled shoulder 15 and is threaded on its end to carry nuts 17—17 which secure the electrode 14 to the cover by means of an intermediate washer 16 and also serve as outside electrical terminals for the anode.

The cover 11 is of soft rubber or other material suitable for gaskets and is provided in its central portion with a downwardly extending cylinder 11—a. The cover 11, including the portion 11—a, is provided with a vertical bore 12, conforming in shape to the stem 10, including its beveled portion 15, so that when the stem is inserted and forced into the cover the cover surrounds it with a snug fit.

The cover 11 is provided with a vertical hole 25 going through almost the whole length of the cover and leaving on the top a layer of small thickness which is perforated by a pin hole 26, provided for the escape of gases which may develop during the operation of the device.

Molded in the cover is a cup shaped insert of sheet material (see Fig. 3) for which any suitable material may be used, preferably a metal like brass or aluminum.

The metal insert 20 comprises a downward extending control tubular portion 21 connecting with a depressed annular section 22 and an upward extending ring 24 which is spun over for the sealing of the container.

Annular section 22 of the insert 20 is provided with a circular perforation indicated at 23 (see Fig. 3) which surrounds the hole 25 of the cover.

For the assembly of the condenser, the stem 10 of the anode 14 is forced into the bore 12 of the cover and pressed against the latter by means of the nuts 17 and the intermediate washer 16, whereby the soft material of the cover forms a perfect seal between the cover and the anode. The cover with the anode is now forced into the container and the edge 24 of the insert 20 spun over the free end of the container whereby an air-tight seal is formed between the cover and the container. I prefer to provide the container with an annular recess 7 against the upper shoulder of which the bottom of the cover is forced. Also I prefer to outwardly flare the free edge of the container, and the edge 24 after the spinning operation.

In the modification of Fig. 4 and Fig. 5 the soft rubber cover 30 is again provided with a central downwardly extending cylindrical portion 31 and a central bore 31—a to receive the stem of the anode. The cover is also provided with a beaded edge 32 as well as a cup shaped projection 34 forming a nipple having a vent hole 35. A vertical hole 33 going through the whole height of the cover and the nipple is provided in the cover to connect the vent hole with the interior of the container.

The insert 36 (see Fig. 5) consists of a central tubular portion 37, an intermediate annular portion 40 and a downwardly offset edge 38. The annular portion 40 is provided with a raised cylindrical extension 39 adapted to surround the hole 33.

The sealing effected between the cover and the anode 14 is the same in this embodiment as in the embodiment of Figs. 1, 2 and 3 previously described. However, the sealing between the cover and the container is obtained in a somewhat different way. The container 5 in this case is provided with an annular recess 41 (see Fig. 4) against the top of which the edge of the portion 38 of the insert 36 abuts when the cover is forced into the container. Thereby the rubber contacts directly with the entire portion 42 of the container projecting beyond the recess 41, thus insuring a tight seal. Furthermore, the free end of the container is spun around the beaded edge 32 of the cover, thus further insuring the tightness of the seal.

While I have shown my invention in a special application and illustrated it in specific embodiments, I do not wish to be limited to such application and embodiments but desire the appended claims to be construed as broad as permissible in view of the prior art.

What I claim as new and desire to secure by Letters Patent is:

1. In an electrolytic device, a container, a soft rubber cover and a reinforcing insert therein, said insert having extensions projecting beyond the cover and adapted to be spun around the free edges of the container.

2. In an electrolytic device in combination, a container provided with an annular recess near to the end thereof, and a cover of a material suitable for gaskets provided with a metallic insert reinforcingly extending toward the lower edge of the cover, said cover when forced into the container resting with its reinforced portion on the recess of the container.

3. In an electrolytic device, a cover of insulating material suitable for gaskets and a reinforcing insert molded therein, said cover forming with said container a liquid and air-tight seal.

4. In an electrolytic device, a container, a soft rubber cover and an insert molded therein, an electrode projecting through the cover, said cover forming around said electrode and with said container a liquid and air-tight seal.

5. In an electrolytic device, a container, a soft rubber cover and a reinforcing insert therein, said insert having extensions projecting beyond the cover and adapted to be spun around the free edge of the container, and an electrode projecting through the container, said cover forming a liquid and air-tight seal around said electrode.

6. In an electrolytic device, in combination a container provided with an annular recess near the end thereof, and a cover of a material suitable for gaskets provided with a peripheral bead and comprising a metallic insert molded therein, said insert reinforcingly extending to the lower edge of the cover, the reinforced portion of the cover resting on the recess of the container and the free end of the container being spun around the bead to form therewith a liquid and air-tight seal.

WALTER WILLIAM CLARK.